W. G. BARNES.
BARBED HOOP-IRON FENCE-STRIP.
No. 191,913. Patented June 12, 1877.
Fig. 1.     Fig. 3.     Fig. 4.
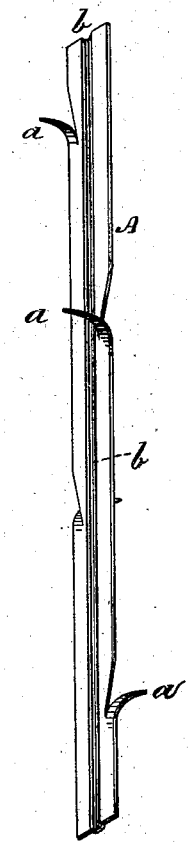 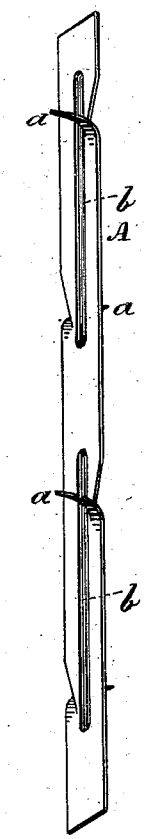 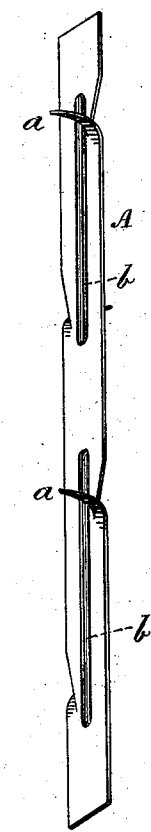
Fig. 2.
Attest:
M. S. Ditmer.
Jno. P. Brooks.
Inventor:
Walter G. Barnes,
by Louis Bagger & Co.
Att'ys.

UNITED STATES PATENT OFFICE.

WALTER G. BARNES, OF FREEPORT, ILLINOIS.

IMPROVEMENT IN BARBED HOOP-IRON FENCE-STRIPS.

Specification forming part of Letters Patent No. 191,913, dated June 12, 1877; application filed April 17, 1877.

*To all whom it may concern:*

Be it known that I, WALTER G. BARNES, of Freeport, in the county of Stephenson and State of Illinois, have invented certain new and useful Improvements in Barbed Fences; and I do hereby declare that the following is a full, clear, and exact description thereof, which will enable others skilled in the art to which it appertains to make and use the same, reference being had to the accompanying drawings, which form a part of this specification.

This invention consists in an improvement on the barbed hoop-iron fence-strip, shown and described in the Letters Patent of the United States No. 118,135, granted to Lyman P. Judson on the 15th day of August, 1871; and my improvement consists in corrugating the strip longitudinally along its middle-line element for the purpose of adding strength to and increasing the stiffness and rigidity of the strip.

In the drawing, Figure 1 represents a perspective view of a piece or section of my improved fence-strip. Fig. 2 is a cross-section of the same; and Figs. 3 and 4 represent modified forms of my improvement.

Similar letters of reference indicate corresponding parts in all the figures.

A is the fence-strip, having spurs or barbs, $a$.

$b$ is a groove or corrugation, formed in the middle of the strip by passing this, preferably before the barbs are cut, through suitably-grooved rolls, or in any other suitable manner. This corrugation may either, as in Fig. 1, extend, without break or interruption, along the entire length of the strip, or it may be broken, as shown in Figs. 3 and 4, one depression being formed directly below the place where the barbs are cut, and where the strip is, therefore, weakest. Again, the sections or parts of this broken corrugation may either be all on one side of the strip, as in Fig. 3, or they may alternate on opposite sides thereof, as in Fig. 4.

Having thus described my inprovement, I claim and desire to secure by Letters Patent of the United States—

A barbed fence-strip, A, having its barbs or spurs cut from the edges, and strengthened by a continuous or broken corrugation along its middle line, substantially as and for the purpose herein set forth.

In testimony that I claim the foregoing as my own, I have hereto affixed my signature in presence of two witnesses.

WALTER G. BARNES.

Witnesses:
WILLIAM BARNES,
RUDOLF HEFTI.